US012547396B2

(12) United States Patent
Liu et al.

(10) Patent No.: US 12,547,396 B2
(45) Date of Patent: Feb. 10, 2026

(54) SOFTWARE PLATFORM-SPECIFIC MUTUAL CALLING METHOD FOR FUNCTIONS OF THIRD-PARTY PROGRAM LIBRARIES, AND MUTUAL CALLING SYSTEM

(71) Applicant: SHANGHAI TOSUN TECHNOLOGY LTD., Shanghai (CN)

(72) Inventors: Chu Liu, Shanghai (CN); Yueyin Xie, Shanghai (CN); Mang Mo, Shanghai (CN)

(73) Assignee: SHANGHAI TOSUN TECHNOLOGY LTD., Shanghai (CN)

( * ) Notice: Subject to any disclaimer, the term of this patent is extended or adjusted under 35 U.S.C. 154(b) by 257 days.

(21) Appl. No.: 18/267,106

(22) PCT Filed: Aug. 10, 2022

(86) PCT No.: PCT/CN2022/111298
§ 371 (c)(1),
(2) Date: Jun. 14, 2023

(87) PCT Pub. No.: WO2023/051039
PCT Pub. Date: Apr. 6, 2023

(65) Prior Publication Data
US 2024/0118888 A1 Apr. 11, 2024

(30) Foreign Application Priority Data
Sep. 29, 2021 (CN) .......................... 202111147972.X

(51) Int. Cl.
G06F 8/71 (2018.01)
G06F 9/44 (2018.01)
G06F 9/445 (2018.01)

(52) U.S. Cl.
CPC ............ *G06F 8/71* (2013.01); *G06F 9/44521* (2013.01)

(58) Field of Classification Search
None
See application file for complete search history.

(56) References Cited

U.S. PATENT DOCUMENTS 5,634,114 A * 5/1997 Shipley ............... G06F 9/44536
717/170
5,995,100 A * 11/1999 Auslander ................. G06F 8/30
717/109

(Continued)

FOREIGN PATENT DOCUMENTS

CN 101165648 A 4/2008
CN 104598247 A 5/2015

(Continued)

OTHER PUBLICATIONS

Kamil Jezek, et al., Supplying Compiler's Static Compatibility Checks by the Analysis of Third-party Libraries, 2013 17th European Conference on Software Maintenance and Reengineering, IEEE Computer Society, 2013, pp. 375-378.

(Continued)

*Primary Examiner* — Philip Wang
(74) *Attorney, Agent, or Firm* — Bayramoglu Law Offices, LLC

(57) ABSTRACT

A software platform-specific mutual calling method for functions of third-party program libraries includes: constructing a plurality of third-party program libraries; verifying validity of the third-party program library; and mutually calling the plurality of third-party program libraries. This implements a general calling framework by using a software platform, such that a function, registered with the software platform, of the third-party program library can be shared among all loaded third-party program libraries. When (Continued)

a current third-party program library needs to call an additional third-party program library, there is no need to load the additional third-party program library, and the additional third-party program library can be accessed only by using a function list that contains the additional third-party program library and that is shared by the software platform for the current third-party program library.

16 Claims, 3 Drawing Sheets

(56) References Cited

U.S. PATENT DOCUMENTS

| | | | | |
|---|---|---|---|---|
| 6,769,115 | B1 * | 7/2004 | Oldman | G06F 8/36 |
| | | | | 717/121 |
| 7,165,253 | B1 * | 1/2007 | Pike | G06F 9/541 |
| | | | | 707/999.102 |
| 7,428,737 | B1 * | 9/2008 | Borghesani | G06F 9/44521 |
| | | | | 717/163 |
| 2020/0293631 | A1 * | 9/2020 | Polisetty | G06F 21/105 |
| 2021/0026710 | A1 | 1/2021 | Gómez et al. | |

FOREIGN PATENT DOCUMENTS

| | | | | | |
|---|---|---|---|---|---|
| CN | 107357667 | A | * | 11/2017 | G06F 9/5016 |
| CN | 107479870 | A | | 12/2017 | |
| CN | 107766164 | A | | 3/2018 | |
| CN | 110795174 | A | | 2/2020 | |
| CN | 111506357 | A | | 8/2020 | |
| CN | 111562928 | A | | 8/2020 | |
| CN | 113867719 | A | | 12/2021 | |
| CN | 113867720 | A | | 12/2021 | |
| EP | 4318209 | A1 | * | 2/2024 | G06F 8/71 |
| JP | 2001022560 | A | | 1/2001 | |
| JP | 2005196432 | A | | 7/2005 | |
| JP | 2008516323 | A | | 5/2008 | |
| JP | 2013524321 | A | | 6/2013 | |
| JP | 2013134754 | A | * | 7/2013 | |
| JP | 2016504684 | A | | 2/2016 | |
| JP | 2017505947 | A | | 2/2017 | |
| JP | 2018538583 | A | | 12/2018 | |
| KR | 102710361 | B1 | * | 9/2024 | G06F 21/14 |
| WO | 2008054133 | A1 | | 5/2008 | |
| WO | 2021079496 | A1 | | 4/2021 | |

OTHER PUBLICATIONS

Chris Porter, et al., Blanklt Library Debloating Getting What You Want Instead of Cutting What You Don't, PLDI '20, 2020, pp. 164-180.

A bite of Linux, The concept of Linux libraries, the creation of dynamic and static libraries, and how to port third-party libraries, 2020, pp. 1-13, retrieved from: https://www.cnblogs.com/yikoulinux/p/13901699.html.

Janyi2018, Dependency issues of multiple dynamic libraries (pay attention to the order), 2019, pp. 1-4, retrieved from: https://blog.csdn.net/sweetfather/article/details/92691637.

Kenji Imamura, "Chapter 5: HTTP Servers and HTTP Clients," in Hands-on Node.js, O'Reilly Japan (1st ed.), 2020, pp. 173-188.

* cited by examiner

SOFTWARE PLATFORM-SPECIFIC MUTUAL CALLING METHOD FOR FUNCTIONS OF THIRD-PARTY PROGRAM LIBRARIES, AND MUTUAL CALLING SYSTEM

CROSS REFERENCE TO THE RELATED APPLICATIONS

This application is the national phase entry of International Application No. PCT/CN2022/111298, filed on Aug. 10, 2022, which is based upon and claims priority to Chinese Patent Application No. 202111147972.X, filed on Sep. 29, 2021, the entire contents of which are incorporated herein by reference.

TECHNICAL FIELD

The present disclosure relates to the technical field of computers, and specifically, to a software platform-specific mutual calling method for functions of third-party program libraries, and a mutual calling system.

BACKGROUND

A Windows-based software platform expands its function by importing a third-party program library. In the third-party program library imported into the software platform, sometimes one third-party program library calls an additional third-party program library. A traditional approach is to modify a current third-party program library and call an additional third-party program library by implicitly or explicitly loading the additional third-party program library.

According to the prior technical solution, when the additional third-party program library is called by modifying the current third-party program library, an additional workload is required for the current third-party program library. As the additional third-party program library changes, the current third-party program library also needs to change synchronously. Moreover, if the current third-party program library calls the additional third-party program library by explicitly loading the additional third-party program library, the current third-party program library cannot load the additional third-party program library if the additional third-party program library does not exist.

Therefore, to resolve the above technical problems, it is desirable to design a new software platform-specific mutual calling method for functions of third-party program libraries, and a mutual calling system.

SUMMARY

The present disclosure is intended to provide a software platform-specific mutual calling method for functions of third-party program libraries, and a mutual calling system.

In order to resolve the above technical problem, the present disclosure provides a software platform-specific mutual calling method for functions of third-party program libraries, including:
  constructing a plurality of third-party program libraries;
  verifying validity of the third-party program library; and
  mutually calling the plurality of third-party program libraries.

Further, a method for constructing the plurality of third-party program libraries includes:
  constructing each of the third-party program libraries by using a software platform, that is, constructing an initialization submodule, a capability obtaining submodule, an internal submodule, and a release submodule in each of the third-party program libraries by using the software platform, where
  the release submodule is configured to automatically release a resource requested by the third-party program library when the third-party program library is unloaded.

Further, a method for constructing the initialization submodule by using the software platform includes:
  generating the initialization submodule by using a software platform header file and a software platform application programming interface (API) list on the software platform, such that after the initialization submodule is called, the third-party program library obtains address information of each API in the API list provided by the software platform.

Further, a method for constructing the capability obtaining submodule by using the software platform includes:
  loading, by the software platform, a software platform version number, a list of a corresponding user logic callback submodule, and a list of an external submodule on which the corresponding third-party program library depends to generate the capability obtaining submodule, and obtaining version information of a software platform corresponding to the third-party program library, list information of the user logic callback submodule, information of the external submodule on which the third-party program library depends, and information of all internal submodules of the third-party program library when an external program calls the capability obtaining submodule.

Further, a method for constructing the internal submodule by using the software platform includes:
  generating the internal submodule based on a user function logic submodule of the software platform.

Further, a method for verifying the validity of the third-party program library includes:
  loading the third-party program library onto the software platform, such that the software platform calls the initialization submodule and the capability obtaining submodule of the third-party program library to obtain a version number of the software platform corresponding to the third-party program library, the list of the user logic callback submodule, address information and function parameter information of all the internal submodules of the third-party program library, and the information of the external submodule on which the third-party program library depends;
  providing, by the software platform, the third-party program library with a pointer of the submodule on which the third-party program library depends,
  if the external submodule on which the third-party program library depends does not exist, providing, by the software platform, the third-party program library with a null pointer;
  in a calling process of the third-party program library, determining, based on whether the pointer is the null pointer, whether there is an additional third-party program library on which the third-party program library depends;
  if the pointer is the null pointer, determining that an internal submodule of the additional third-party program library on which the third-party program library depends does not take effect, but functions of other internal submodules of the third-party program library still take effect; and comparing, by the software platform, the obtained version number of the software platform corresponding to the third-party program library with the software platform version number, and stopping calling the third-party program library if the version number of the software platform corresponding to the third-party program library is greater than the software platform version number, or continuing calling the third-party program library if the version number of the software platform corresponding to the third-party program library is less than or equal to the software platform version number.

Further, a method for mutually calling the plurality of third-party program libraries includes:
  after the software platform continues calling the third-party program library, calling, by the software platform, the third-party program library based on the list of the user logic callback submodule and a list of the internal submodule that are obtained from the third-party program library;
  if the current third-party program library needs to call the internal submodule of the additional third-party program library during running, transferring, by the software platform, the pointer of the submodule on which the current third-party program library depends in the capability obtaining submodule to allow the current third-party program library to call the internal submodule of the additional third-party program library; and
  after the calling is completed, releasing, by the software platform, the requested resource by calling the release submodule in the third-party program library.

According to a second aspect, the present disclosure further provides a software platform for the above software platform-specific mutual calling method for functions of third-party program libraries, including:
  a software platform header file, a software platform API list, a software platform version number, a list of a user logic callback submodule, a list of an external submodule on which a third-party program library depends, a user function logic submodule, and a C++ compiler.

According to a third aspect, the present disclosure further provides a third-party program library for the above software platform-specific mutual calling method for functions of third-party program libraries, including:
  an initialization submodule, a capability obtaining submodule, an internal submodule, and a release submodule.

According to a fourth aspect, the present disclosure further provides a mutual calling system using the above software platform-specific mutual calling method for functions of third-party program libraries, including:
  a construction module configured to construct a plurality of third-party program libraries;
  a verification module configured to verify validity of the third-party program library; and
  a calling module configured to mutually call the plurality of third-party program libraries.

The present disclosure has following beneficial effects: The present disclosure constructs a plurality of third-party program libraries, verifies validity of the third-party program library, and mutually calls the third-party program libraries. This implements a general calling framework by using a software platform, such that a function, registered with the software platform, of the third-party program library can be shared among all loaded third-party program libraries. In this way, when a current third-party program library needs to call an additional third-party program library, there is no need to load the additional third-party program library, and the additional third-party program library can be accessed only by using a function list that contains the additional third-party program library and that is shared by the software platform for the current third-party program library. When the additional third-party program library is not loaded, both the software platform and the current third-party program library can learn about this situation, which allows the current third-party program library to be loaded smoothly and provide partial functions.

Other features and advantages of the present disclosure will be described in the following description, and some of these will become apparent from the description or be understood by implementing the present disclosure. The objectives and other advantages of the present disclosure can be implemented or obtained by structures specifically indicated in the description and accompanying drawings.

In order to make the above objectives, features, and advantages of the present disclosure clearer and more understandable, the present disclosure is described in detail below using preferred embodiments with reference to the accompanying drawings.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. Apparently, the accompanying drawings in the following description show merely some implementations of the present disclosure, and a person of ordinary skill in the art may still derive other accompanying drawings from these accompanying drawings without creative efforts.

DETAILED DESCRIPTION OF THE EMBODIMENTS

In order to make the objectives, technical solutions, and advantages of the embodiments of the present disclosure clearer, the technical solutions in the present disclosure are described clearly and completely below with reference to the accompanying drawings. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
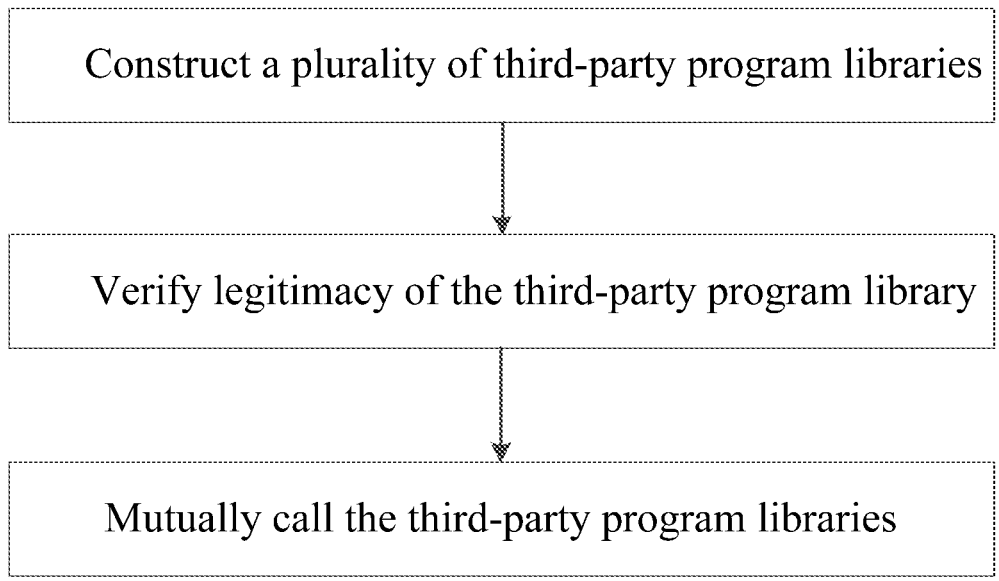
FIG. 1 is a flowchart of a software platform-specific mutual calling method for functions of third-party program libraries according to the present disclosure.

FIG. 1 is a flowchart of a software platform-specific mutual calling method for functions of third-party program libraries according to the present disclosure.

As shown in FIG. 1, Embodiment 1 provides a software platform-specific mutual calling method for functions of third-party program libraries, including: constructing a plurality of third-party program libraries; verifying validity of the third-party program library; and mutually calling the plurality of third-party program libraries. This implements a general calling framework by using a software platform, such that a function, registered with the software platform, of the third-party program library can be shared among all loaded third-party program libraries. In this way, when a current third-party program library needs to call an additional third-party program library, there is no need to load the additional third-party program library, and the additional third-party program library can be accessed only by using a function list that contains the additional third-party program library and that is shared by the software platform for the current third-party program library. When the additional third-party program library is not loaded, both the software platform and the current third-party program library can learn about this situation, which allows the current third-party program library to be loaded smoothly and provide partial functions.

Figure 2:
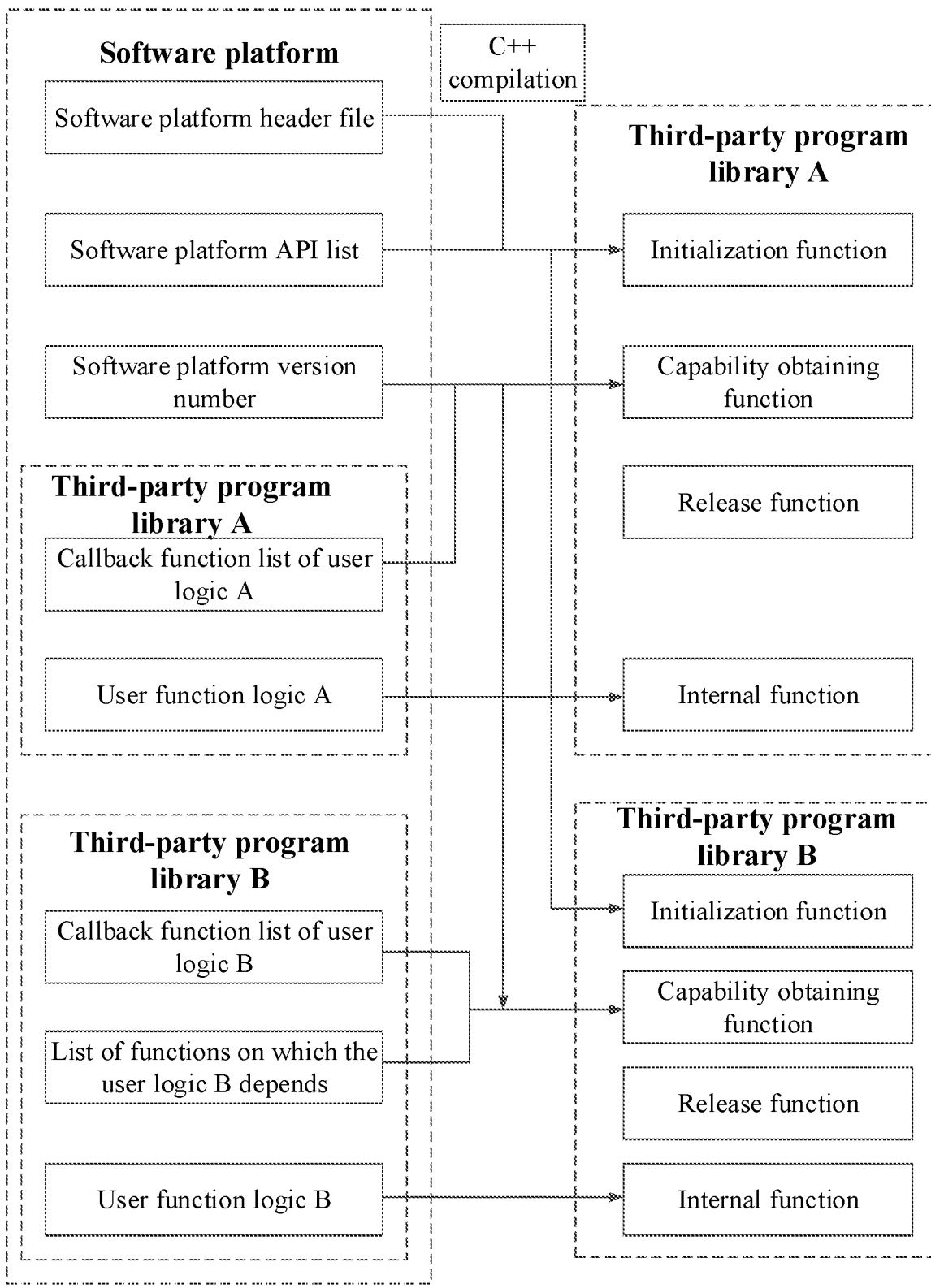
FIG. 2 is a flowchart of constructing a plurality of third-party program libraries according to the present disclosure.

FIG. 2 is a flowchart of constructing the plurality of third-party program libraries according to the present disclosure.

As shown in FIG. 2, in this embodiment, a method for constructing the plurality of third-party program libraries includes: calling a C++ compiler by using the software platform, to construct each of the third-party program libraries, that is, constructing an initialization submodule (containing an initialization function and a corresponding function), a capability obtaining submodule (containing a capability obtaining function and a corresponding function), an internal submodule (containing an internal function and a corresponding function), and a release submodule (containing a release function and a corresponding function) in each of the third-party program libraries by using the software platform. The release submodule is configured to automatically release a resource requested by the third-party program library when the third-party program library is unloaded. The initialization submodule, the capability obtaining submodule, and the release submodule are public submodules, and the functions in the submodules can be automatically loaded and called by an external program. The functions in the internal submodule are invisible externally.

In this embodiment, a method for constructing the initialization submodule by using the software platform includes: generating the initialization submodule by using a software platform header file and a software platform API list on the software platform, such that after the initialization submodule is called, the third-party program library obtains address information of each API in the API list provided by the software platform to work normally.

In this embodiment, a method for constructing the capability obtaining submodule by using the software platform includes: loading, by the software platform, a software platform version number, a list of a corresponding user logic callback submodule, and a list of an external submodule on which the corresponding third-party program library depends to generate the capability obtaining submodule, and obtaining version information of a software platform corresponding to the third-party program library, list information of the user logic callback submodule, information of the external submodule on which the third-party program library depends, and information of all internal submodules of the third-party program library when the external program calls the capability obtaining submodule.

In this embodiment, a method for constructing the internal submodule by using the software platform includes: generating the internal submodule based on a user function logic submodule of the software platform. The internal submodule does not provide open interfaces, but these interfaces can only be obtained by the external program (the third-party program library) by calling the capability obtaining function.

Figure 3:
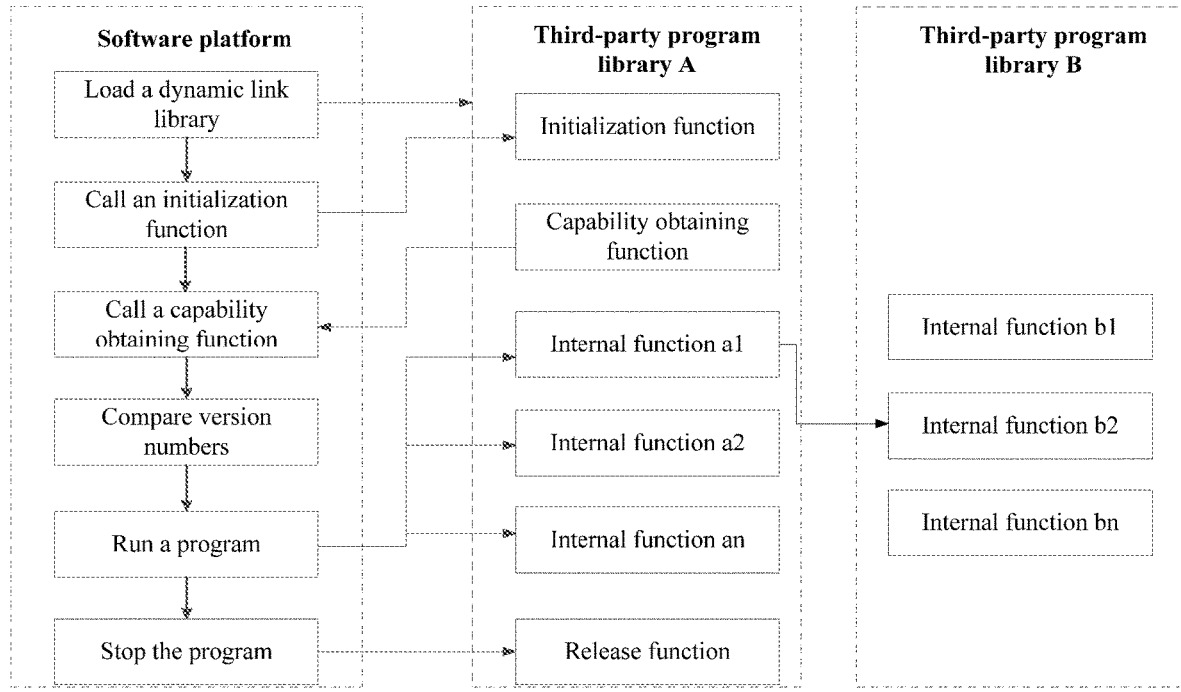
FIG. 3 is a flowchart of mutually calling a plurality of third-party program libraries according to the present disclosure.

FIG. 3 is a flowchart of mutually calling the plurality of third-party program libraries according to the present disclosure.

As shown in FIG. 3, in this embodiment, a method for verifying the validity of the third-party program library includes: completing a calling process of the third-party program library through cooperation between the software platform and the third-party program library; loading the third-party program library onto the software platform by loading a dynamic link library on the software platform, such that the software platform calls the initialization submodule and the capability obtaining submodule of the third-party program library to obtain a version number of the software platform corresponding to the third-party program library, the list of the user logic callback submodule, address information and function parameter information of all the internal submodules in the third-party program library, and the information of the external submodule on which the third-party program library; providing, by the software platform during calling of the capability obtaining function, the third-party program library with a pointer of the submodule on which the third-party program library depends (providing a function pointer of an internal function of an additional third-party program library on which the third-party program library depends), where if the external submodule on which the third-party program library depends does not exist, the software platform provides the third-party program library with a null pointer; in the calling process of the third-party program library, determining, based on whether the pointer is the null pointer, whether there is the additional third-party program library on which the third-party program library depends; if the pointer is the null pointer, determining that an internal submodule of the additional third-party program library on which the third-party program library depends does not take effect, but functions of other internal submodules of the third-party program library still take effect; and comparing, by the software platform, the obtained version number of the software platform corresponding to the third-party program library with the software platform version number, and if the version number of the software platform corresponding to the third-party program library is greater than the software platform version number, stopping calling the third-party program library, or if the version number of the software platform corresponding to the third-party program library is less than or equal to the software platform version number, determining that the third-party program library is legal (meets a requirement) and continuing calling the third-party program library.

In this embodiment, a method for mutually calling the plurality of third-party program libraries includes: after the software platform continues calling the third-party program library, calling, by the software platform, the third-party program library based on the list of the user logic callback submodule and a list of the internal submodule that are obtained from the third-party program library; if the current third-party program library needs to call the internal submodule of the additional third-party program library during running, transferring, by the software platform, the pointer of the submodule on which the current third-party program library depends in the capability obtaining submodule to allow the current third-party program library to call the internal submodule of the additional third-party program library; and after the calling is completed, releasing, by the software platform, the requested resource by calling the release submodule in the third-party program library. When calling the third-party program library, the software platform can not only know internal functions of all other third-party program libraries on which the third-party program library depends, but also provide the third-party program library with the function pointers on which the third-party program library depends. This allows the software platform to provide a dependency without manually modifying the third-party equation libraries when there is a mutual dependency between the third-party equation libraries. Moreover, various functional dependencies are provided to a third-party program library by the software platform. This method can avoid frequent modifications to a third-party program library to achieve a dependency on an additional third-party program library, improve development efficiency of a third-party function library, and reduce a possibility of an error.

In this embodiment, third-party program library A and third-party program library B are constructed by using the software platform. When the software platform calls the third-party program library A, the third-party program library A needs to depend on some internal functions of the third-party program library B. Therefore, the software platform sends function pointers of the internal functions on which the third-party program library A depends to the third-party program library A to call the corresponding internal functions from the third-party program library B.

In this embodiment, the software platform includes: the software platform header file, the software platform API list containing API symbol information, the software platform version number, user logic generated by a user by using the software platform (which is represented by a callback function), self logic designed by the user by using the software platform (which is represented by a common function), and a function list of an additional third-party program library on which the user logic depends (which is represented by function-related symbol information). In a process of constructing each of the third-party program libraries that can be mutually called on the software platform, it is first necessary to generate the initialization function of the third-party program library, where source code of the initialization function is generated based on the software platform header file and the software platform API list containing the API symbol information. Then, it is necessary to generate the capability obtaining function whose source code is constituted by the software platform version number, symbol information of a user logic callback function, and symbol information of a function of the third-party program library on which the user logic depends. Moreover, it is necessary to generate the release function that is responsible for releasing the requested resource before the third-party program library is unloaded. Finally, it is necessary to generate a series of internal functions, which are self logic designed by the user by using the software platform. After all the required functions are generated, the software platform calls a C/C++ compiler to compile the generated functions into an executable file of the third-party program library.

In this embodiment, the software platform further includes: a dynamic link library loading function, a function calling function, a dependent-function management function, a version number comparison function, a running function, and a stopping function.

When calling the third-party program libraries that can be mutually called, the software platform first needs to load the third-party program library by using the dynamic link library loading function. After successful loading, the initialization function of the third-party program library is called by using the function calling function, and then the capability obtaining function of the third-party program library is called by using the function calling function. The software platform version number, the user logic callback function, and symbol information of a third-party function on which the user logic depends, which are compiled into the capability obtaining function, are read and input to the software platform. The software platform learns a relationship between a constructed version number of the third-party program library and the software platform version number. The software platform continues calling the third-party program library only when the constructed version number is the same as the software platform version number or when the software platform version number is greater than the constructed version number of the third-party program library. Otherwise, the calling process is terminated. Moreover, the dependent-function management function of the software platform also needs to detect whether a dependent function of the third-party program library exists on the software platform. If the dependent function of the third-party program library exists on the software platform, a first address of the dependent function needs to be provided to the third-party program library. If the dependent function of the third-party program library does not exist on the software platform, the null pointer needs to be provided to the third-party program library. After the version number comparison function and the dependent-function management function are executed and a flag indicating that the calling can be continued is returned, the software platform executes the running function. In a running process, the internal function of the third-party program library will be freely called by the software platform to provide various functions for the software platform. When the third-party program library needs to call a function on which the third-party program library depends, whether the dependent function is the null pointer is determined. If the dependent function is not the null pointer, the calling is continued. Otherwise, it is determined that a library on which the third-party program library does not exist, a relevant function does not take effect, a failure is returned in the current calling process. If the third-party program library is not required, the software platform executes the stopping function to call the release function of the third-party program library. After the resource requested by the third-party program library is released, the calling process ends.

Specifically, in this embodiment, the following two third-party program libraries are used as examples to illustrate the mutual calling method: a third-party program library of a general CRC16 algorithm, and a third-party program library used for a calibration system, which depends on the general CRC16 algorithm to unlock a target controller. The two third-party program libraries are successively loaded by the software platform, and the software platform uniformly provides the user with a check function of the CRC16 algorithm and a calibration function of the calibration system. A third-party program library of a traditional general CRC16 algorithm needs to export an API function on which the external program depends during compilation. A third-party program library used for a traditional calibration system depends on the third-party program library of the general CRC16 algorithm, so it is necessary to import a dependent function in the third-party program library of the general CRC16 algorithm into the third-party program library used for the traditional calibration system, and load the third-party program library of the general CRC16 algorithm first in a loading process. If the third-party program library of the general CRC16 algorithm does not exist, the third-party program library used for the calibration system fails to be loaded and cannot provide any function to a software platform user. If a function change occurs in the third-party program library of the general CRC16 algorithm, for example, a quantity of function parameters of the CRC16 algorithm are increased from three to four, but a third-party function library used for the calibration system is not updated synchronously for some reason, the two third-party program libraries can be loaded normally, but a crash may occur when the third-party program library used for the calibration system calls a CRC16 program library. Therefore, a traditional method for referencing an additional library by a program library of the software platform by using a static link and lack of interface definition check during running make availability of the software platform decline, which makes it difficult to troubleshoot a problem if any. The software platform provided in this embodiment adopts a different method, and a working process of the software platform is as follows: Both the third-party program library of the CRC16 algorithm and the third-party program library used for the calibration system take an API on which the external program depends as an internal function, without exporting any API function. The software platform successively loads the third-party program library of the CRC16 algorithm and the third-party program library used for the calibration system. The software platform calls capability obtaining functions of the two third-party program libraries to obtain an internal function list of each program library and definition information of each function, including function address information, parameter information, and the like. The software platform calls the capability obtaining functions of the two third-party program libraries to obtain a list of functions that are of an additional program library and on which each program library depends and definition information of each function, including function address information, parameter information, and the like. The software platform analyzes the dependent function of each third-party program library and detects that the third-party program library used for the calibration system depends on the third-party program library of the CRC16 algorithm. Therefore, the address information of the dependent function in the third-party program library used for the calibration system is assigned to the corresponding function address information of the third-party program library of the CRC16 algorithm. The software platform analyzes the function definition information of the dependent function of each third-party program library, including parameter information and the like. If it is found that a definition of an internal API function of the third-party program library of the CRC16 algorithm is different from that of the corresponding dependent function of the third-party program library used for the calibration system, a warning is issued to the user and the third-party program library used for the calibration system is prohibited to run. After a dependence relationship between the third-party program libraries passes the verification, the software platform can normally call the two third-party program libraries to provide a service to the user.

Embodiment 2

Based on Embodiment 1, Embodiment 2 provides a software platform for the software platform-specific mutual calling method for functions of third-party program libraries in Embodiment 1. The software platform includes: a software platform header file, a software platform API list, a software platform version number, a list of a user logic callback submodule, a list of an external submodule on which a third-party program library depends, a user function logic submodule, and a C++ compiler.

In this embodiment, the submodules contained in the software platform and their functions have been described in detail in Embodiment 1, and details are not described again in this embodiment.

Embodiment 3

Based on Embodiment 1, Embodiment 3 provides a third-party program library for the software platform-specific mutual calling method for functions of third-party program libraries in Embodiment 1. The third-party program library includes an initialization submodule, a capability obtaining submodule, an internal submodule, and a release submodule.

In this embodiment, the submodules contained in the third-party program library and their functions have been described in detail in Embodiment 1, and details are not described again in this embodiment.

Embodiment 4

Figure 4:
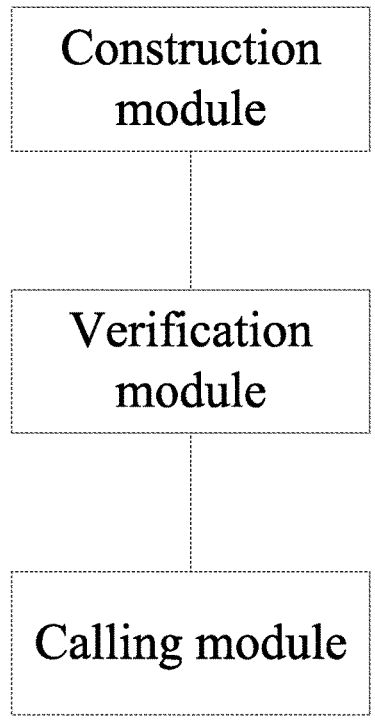
FIG. 4 is a functional block diagram of a mutual calling system according to the present disclosure.

FIG. 4 is a functional block diagram of a mutual calling system according to the present disclosure.

Based on Embodiment 1, Embodiment 4 provides a mutual calling system using the software platform-specific mutual calling method for functions of third-party program libraries in Embodiment 1. The mutual calling system includes: a construction module configured to construct a plurality of third-party program libraries; a verification module configured to verify validity of the third-party program library; and a calling module configured to mutually call the plurality of third-party program libraries.

In this embodiment, specific functions of the modules have been described in detail in Embodiment 1, and details are not described again in this embodiment.

Embodiment 5

Based on the above embodiments, Embodiment 5 provides a calling apparatus, including a software platform and a plurality of third-party program libraries. The software platform is configured to construct and call the third-party program library. The third-party program libraries can be mutually called by using the software platform.

In this embodiment, functions of the software platform and the third-party program library have been described in detail in the above embodiments, and details are not described again in this embodiment.

To sum up, the present disclosure constructs a plurality of third-party program libraries and mutually calls the third-party program libraries. This implements a general calling framework by using a software platform, such that a function, registered with the software platform, of the third-party program library can be shared among all loaded third-party program libraries. In this way, when a current third-party program library needs to call an additional third-party program library, there is no need to load the additional third-party program library, and the additional third-party program library can be accessed only by using a function list that contains the additional third-party program library and that is shared by the software platform for the current third-party program library. When the additional third-party program library is not loaded, both the software platform and the current third-party program library can learn about this situation, which allows the current third-party program library to be loaded smoothly and provide partial functions.

In several embodiments provided in the present disclosure, it should be understood that the disclosed device and method may be implemented in other manners. The device embodiments described above are merely examples. For example, the flowcharts and block diagrams in the accompanying drawings show the possible implementation architecture, functions, and operations of the devices, methods, and computer program products according to multiple embodiments of the present disclosure. Each block in the flowcharts or block diagrams may represent a module, a program segment, or a part of code, and the module, the program segment, or the part of code contains one or more executable instructions used to implement specified logical functions. It should also be noted that, in some alternative implementations, the functions marked in the blocks may alternatively occur in a different order from that marked in the drawings. For example, two consecutive blocks can actually be executed in parallel, or sometimes can be executed in the reverse order, depending on the functions involved. It should also be noted that each block in the flowcharts and/or block diagrams and combinations of the blocks in the flowcharts and/or block diagrams may be implemented by a dedicated hardware-based system for executing specified functions or operations, or may be implemented by a combination of dedicated hardware and computer instructions.

Moreover, all functional modules in the embodiments of the present disclosure may be integrated into one independent part, or each of the modules may exist alone physically, or two or more modules may be integrated into one independent part.

The functions, if implemented in the form of a software functional module and sold or used as a stand-alone product, may be stored in a computer-readable storage medium. Based on such understanding, the technical solutions of the present disclosure essentially or the part contributing to the prior art may be implemented in a form of a software product. The computer software product may be stored in a storage medium, and includes several instructions for enabling a computer device (which may be a personal computer, a server, a network device, or the like) to perform all or some steps of the methods described in the embodiments of the present disclosure. The foregoing storage medium includes: any medium that can store program code, such as a USB flash disk, a removable hard disk, a read-only memory (ROM), a random access memory (RAM), a magnetic disk, or an optical disc.

Under the inspiration of the above ideal examples of the present disclosure, a skilled person can absolutely make various changes and modifications through the above description content without departing from the scope of the technical idea of the present disclosure. The technical scope of the present disclosure is not limited to the content of the description, which must be determined according to the scope of the claims.

What is claimed is:

1. A software platform-specific mutual calling method for functions of a plurality of third-party program libraries, comprising:
    constructing the plurality of third-party program libraries;
    verifying validity of the plurality of third-party program libraries; and
    mutually calling the plurality of third-party program libraries;
    wherein a method for constructing the plurality of third-party program libraries comprises:
    constructing each of the plurality of third-party program libraries by using a software platform, wherein an initialization submodule, a capability obtaining submodule, an internal submodule, and a release submodule in each of the plurality of third-party program libraries are constructed by using the software platform, wherein
    the release submodule is configured to automatically release a resource requested by a corresponding third-party program library of the plurality of third-party program libraries when the third-party program library is unloaded;
    wherein a method for constructing the initialization submodule by using the software platform comprises:
    generating the initialization submodule by using a software platform header file and a software platform application programming interface (API) list on the software platform, such that after the initialization submodule is called, the corresponding third-party program library obtains address information of each API in the API list provided by the software platform;
    wherein a method for constructing the capability obtaining submodule by using the software platform comprises:
    loading, by the software platform, a software platform version number, a list of a corresponding user logic callback submodule, and a list of an external submodule on which the corresponding third-party program library depends to generate the capability obtaining submodule, and obtaining version information of a software platform corresponding to the third-party program library, list information of the user logic callback submodule, information of the external submodule on which the third-party program library depends and information of all internal submodules of the third-party program library when an external program calls the capability obtaining submodule.

2. The software platform-specific mutual calling method for the functions of the plurality of third-party program libraries according to claim 1, wherein
    a method for constructing the internal submodule by using the software platform comprises:
    generating the internal submodule based on a user function logic submodule of the software platform.

3. The software platform-specific mutual calling method for the functions of the plurality of third-party program libraries according to claim 2, wherein
    a method for verifying the validity of the third-party program library comprises:
    loading the corresponding third-party program library onto the software platform, such that the software platform calls the initialization submodule and the capability obtaining submodule of the third-party program library to obtain a version number of the software platform corresponding to the third-party program library, the list of the user logic callback submodule, address information and function parameter information of all the internal submodules of the third-party program library, and the information of the external submodule on which the third-party program library depends;
    providing, by the software platform, the third-party program library with a pointer of the external submodule on which the third-party program library depends, when the external submodule on which the third-party program library depends does not exist, providing, by the software platform, the third-party program library with a null pointer;

in a calling process of the third-party program library, determining, based on whether the pointer is the null pointer, whether there is an additional third-party program library on which the third-party program library depends;

when the pointer is the null pointer, determining that an internal submodule of the additional third-party program library on which the third-party program library depends does not take effect, but functions of other internal submodules of the third-party program library still take effect; and comparing, by the software platform, the obtained version number of the software platform corresponding to the third-party program library with the software platform version number, and stopping calling the third-party program library when the version number of the software platform corresponding to the third-party program library is greater than the software platform version number, or continuing calling the third-party program library when the version number of the software platform corresponding to the third-party program library is less than or equal to the software platform version number.

4. The software platform-specific mutual calling method for the functions of the plurality of third-party program libraries according to claim 3, wherein a method for mutually calling the plurality of third-party program libraries comprises:

after the software platform continues calling the corresponding third-party program library, calling, by the software platform, the third-party program library based on the list of the user logic callback submodule and a list of the internal submodule, wherein the list of the user logic callback submodule and the list of the internal submodule are obtained from the third-party program library;

when a current third-party program library needs to call the internal submodule of the additional third-party program library during running, transferring, by the software platform, the pointer of the external submodule on which the current third-party program library depends in the capability obtaining submodule to allow the current third-party program library to call the internal submodule of the additional third-party program library; and after the calling is completed, releasing, by the software platform, the requested resource by calling the release submodule in the third-party program library.

5. A software platform for the software platform-specific mutual calling method for the functions of the plurality of third-party program libraries according to claim 4, comprising:

the software platform header file, the software platform API list, the software platform version number, the list of the user logic callback submodule, the list of the external submodule on which each of the plurality of third-party program libraries depends, and the user function logic submodule.

6. A third-party program library for the software platform-specific mutual calling method for the functions of the plurality of third-party program libraries according to claim 4, comprising:

the initialization submodule, the capability obtaining submodule, the internal submodule, and the release submodule.

7. A mutual calling system using the software platform-specific mutual calling method for the functions of the plurality of third-party program libraries according to claim 4, comprising:

a construction module configured to construct the plurality of third-party program libraries;

a verification module configured to verify the validity of the plurality of third-party program libraries; and a calling module configured to mutually call the plurality of third-party program libraries.

8. A software platform for the software platform-specific mutual calling method for the functions of the plurality of third-party program libraries according to claim 3, comprising:

the software platform header file, the software platform API list, the software platform version number, the list of the user logic callback submodule, the list of the external submodule on which each of the plurality of third-party program libraries depends, and the user function logic submodule.

9. A third-party program library for the software platform-specific mutual calling method for the functions of the plurality of third-party program libraries according to claim 3, comprising:

the initialization submodule, the capability obtaining submodule, the internal submodule, and the release submodule.

10. A mutual calling system using the software platform-specific mutual calling method for the functions of the plurality of third-party program libraries according to claim 3, comprising:

a construction module configured to construct the plurality of third-party program libraries;

a verification module configured to verify the validity of the plurality of third-party program libraries; and a calling module configured to mutually call the plurality of third-party program libraries.

11. A software platform for the software platform-specific mutual calling method for the functions of the plurality of third-party program libraries according to claim 2, comprising:

the software platform header file, the software platform API list, the software platform version number, the list of the user logic callback submodule, the list of the external submodule on which each of the plurality of third-party program libraries depends, and the user function logic submodule.

12. A third-party program library for the software platform-specific mutual calling method for the functions of the plurality of third-party program libraries according to claim 2, comprising:

the initialization submodule, the capability obtaining submodule, the internal submodule, and the release submodule.

13. A mutual calling system using the software platform-specific mutual calling method for the functions of the plurality of third-party program libraries according to claim 2, comprising:

a construction module configured to construct the plurality of third-party program libraries;

a verification module configured to verify the validity of the plurality of third-party program libraries; and a calling module configured to mutually call the plurality of third-party program libraries.

14. A software platform for the software platform-specific mutual calling method for the functions of the plurality of third-party program libraries according to claim 1, comprising:
- a software platform header file, a software platform API list, a software platform version number, a list of a user logic callback submodule, a list of an external submodule on which each of the plurality of third-party program libraries depends, and a user function logic submodule.

15. A third-party program library for the software platform-specific mutual calling method for the functions of the plurality of third-party program libraries according to claim 1, comprising:
- an initialization submodule, a capability obtaining submodule, an internal submodule, and a release submodule.

16. A mutual calling system using the software platform-specific mutual calling method for the functions of the plurality of third-party program libraries according to claim 1, comprising:
- a construction module configured to construct the plurality of third-party program libraries;
- a verification module configured to verify the validity of the plurality of third-party program libraries; and
- a calling module configured to mutually call the plurality of third-party program libraries.

* * * * *